United States Patent Office 2,790,817
Patented Apr. 30, 1957

2,790,817

ORGANIC MERCURY COMPOUNDS

Lincoln H. Werner, Summit, N. J., and Caesar R. Scholz, Binningen (Baselland), Switzerland, assignors to Ciba Pharmaceutical Products, Inc., Summit, N. J., a corporation of New Jersey No Drawing. Application December 15, 1953, Serial No. 398,411

6 Claims. (Cl. 260—431)

This invention relates to organic mercury compounds and to the preparation thereof.

Certain types of organic mercury compounds are known to produce intense diuresis. In general, drugs of this type in current use possess in common the moiety of the structure:

wherein $R^1$ is hydrogen, lower alkyl, e. g. methyl, or lower hydroxyalkyl, e. g. $-C_2H_4OH$ or $-C_3H_6OH$, and $R^2$ is the theophylline or a mercapto organic acid residue, and the moiety as a whole is attached to a dicarboxylated radical by way of a connection involving an amide linkage. These drugs leave little to be desired as far as their diuretic effect is concerned but they do give rise to serious side effects. Thus, those previously-used drugs containing the theophylline residue have been reported to exhibit an acute cardiac toxicity in some patients [Stanley, Virginia Medical Monthly, vol. 76, page 416 (1939)]. When such previously-used organic mercurial is combined with sodium thioglycollate, the acute cardiac toxicity is reduced but it has been reported that renal damage may result (Capps et al., Proc. Soc. Expt'l Biol., vol. 74, page 511).

Such compounds of the prior art have been made by mercurating an allyl derivative of an amide containing the moiety $$-CONHCH_2CH=CH_2$$

whereby a mercurated product is formed of the type $$-CONHCH_2CHOR'CH_2HgOAc$$

which on treatment with theophylline or a mercapto acid produces the final product.

It is a primary object of the invention to provide a new type of organic mercury compound corresponding to the structure

wherein $R^1$ stands for hydrogen, lower alkyl, or lower hydroxy alkyl, $R^2$ is a radical derived from theophylline, or is a sulfur bearing radical derived from a compound such as a mercapto organic acid, for example thioglycollic acid or a mercapto-polyhydroxy alkane such as thiosorbitol and the like, $R^3$ is a member selected from the group consisting of hydrogen, $-(CHOH)_{n-1}CH_2OH$ and $-(CHOH)_{n-1}CHO$ and $R^4$ is a member selected from the group consisting of hydrogen and $$-(CHOH)_{n-1}CH_2OH$$

$n$ being a whole number from 1 to 6, at most one of $R^3$ and $R^4$ being hydrogen and the total number of carbon atoms in $R^3$—C—$R^4$ being within the range of 3 to 6 inclusive. The invention extends also to compounds in which the hydroxyls of the $R^3$ and $R^4$ radicals are protected as, for example, by ester, acetal or ketal groups.

The thus described compounds of this invention are produced conveniently by mercurating the mono-allyl-ether of a suitable polyol compound followed by reacting the resulting product with the sulfur bearing moiety.

The mercurating reaction is carried out with the aid of a mercuric salt such as mercuric acetate, mercuric benzoate, or mercuric tartrate in a suitable solvent, mercuric chloride, or mercuric nitrate in a suitable solvent with occasional additions of alkali to maintain turbidity caused by precipitation of mercuric oxide; or with the aid of mercuric oxide in a suitable solvent containing one equivalent of an acid such as acetic, benzoic, tartaric, nitric and the like. The reaction product is recovered from the reaction solution by precipitation or by evaporating the solution to dryness, or by drying from the frozen state.

Suitable polyol compounds from which the allyl ethers are derived are selected, for example, from carbohydrates, more particularly the aldoses, ketoses, the alcohols formed by reduction of the carbonyl group present in aldoses and ketoses, and derivatives of such wherein the hydoxyl radicals are protected by ester, acetal or ketal groups and the like. Examples of suitable allyl polyol ethers are allyl ethers derived from glycerol, glucose, xylitol, mannitol, sorbitol and the like of a polyol wherein hydroxyls on the carbons of the polyol adjacent to the ether bearing carbon are protected as, for example, 1,2-acetone glycerol, 1,2;4,5-diacetone xylitol, 1,2;5,6-diacetone glucose, or by ester groups such as diacetyl glycerol, pentaacetyl mannitol and the like.

The choice of the solvent in which to carry out the mercuration depends upon the starting material and the mercurated product to be produced. When $R^1$ is alkyl, the solvent chosen is the alcohol $R^1OH$. Products in which $R^1$ is hydrogen are best produced by mercurating an allyl polyol ether in which hydroxyl radicals on the carbon atoms of the polyol adjacent to the carbon bearing the ether linkage are protected by ester, acetal or ketal groups in a solvent such as aqueous dioxane, aqueous glycol dimethyl ether, aqueous acetone and the like, followed, if desired, by removal of the protecting groups. Mercuration in aqueous medium of an allyl-polyol ether in which the hydroxyls are not protected leads to the formation of products having a dioxane structure

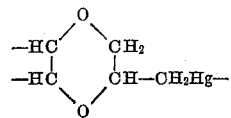

The preparation of suitable mercurated intermediate compounds is disclosed in our copending application Serial No. 360,811, filed December 15, 1953.

The reaction between the mercurated allyl-polyol ether and the sulfur bearing moiety is carried out in water, methanol, ethanol, or in a dilute aqueous solution of methanol, acetone or the like. The resulting reaction product is then precipitated from the solution by adding further quantities of water soluble solvents such as acetone, methanol, ethanol, dioxane and the like. The precipitated product is separated, washed and dried, whereupon it is obtained as a highly water soluble powder.

Suitable sulfur bearing moieties are mercapto acids containing the sulfhydryl radical such as thioglycolic acid, cysteine and the like, or a mercapto polyol compound such as, for example, thioglycerol, thiosorbitol, thiomannitol and the like.

Alternatively, the mercurated allyl derivative and the theophylline or sulfur bearing moiety are mixed in stoichiometric amounts in water, and the resultant solution is frozen and dried from the frozen state to yield a product which is stable and readily soluble upon mere addition of water.

Protective groups on the hydroxyls of the allyl-polyol ether, when present, may be removed after the step of mercuration by methods known in the art. For example, when the protective groups are isopropylidine radicals removal may be accomplished by warming with aqueous acetic acid; or when the protective groups are acyl radicals such as acetyl, removal may be accomplished by treating with an alkali such as alcoholic sodium hydroxide.

The products of the invention do not exhibit a melting point or decomposition point. However, the nature of the reaction is such that, by using pure final intermediates (especially the mercurated intermediate) and employing a slight excess of thio derivative, theophylline etc. so that no free mercury remains, products which are eminently satisfactory for medicinal use as diuretics are obtained.

In the examples below the invention is illustrated in greater detail but it is to be understood that the examples are presented by way of illustration and not limitation. Parts by weight bear the same relation to parts by volume as do grams to milliliters. Temperatures are expressed as degrees centigrade.

*Example 1*

17.2 parts by weight of 4-allyloxymethyl-2,2-dimethyl-1,3-dioxolane is dissolved in 50 parts by volume of methanol. A solution of 31.9 parts by weight of mercuric acetate in 350 parts by volume of methanol is added slowly with stirring. The reaction mixture is allowed to stand overnight, a sample tested for free mercury ion by making alkaline and, in the absence of excess of free mercury ion, the reaction mixture evaporated to dryness. The product is dissolved in anhydrous ethanol, the solution filtered and then evaporated to dryness again. 4-(3-acetoxymercuri - 2 - methoxypropoxymethyl) - 2,2 - dimethyl-1,3-dioxolane is obtained of the following structure

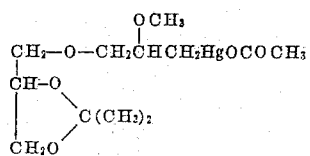

9.25 parts by weight of this compound is dissolved in 140 parts by volume of 50% aqueous acetic acid and warmed to 60° for two hours. The reaction mixture is then evaporated to dryness, the product is dissolved in anhydrous ethanol, and again evaporated to dryness. 1-(2-methoxy-3-acetoxymercuripropyl)-glycerol is obtained as a colorless highly viscous oil. It corresponds to the formula

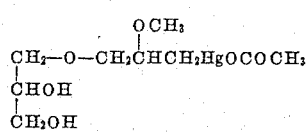

4.23 parts by weight of 1-(2-methoxy-3-acetoxy-mercuripropyl)-glycerol are dissolved in 15 parts by volume of water to which 1.99 parts by weight of 1-thiosorbitol dissolved in 5 parts by volume of water is added. The resulting solution is frozen and dried under reduced pressure from the frozen state. The product, 1-S-[3-(2,3-dihydroxypropoxy) - 2 - methoxy - propyl - mercuri] - 1-thiosorbitol is thus obtained as a spongy friable solid which is hygroscopic and highly soluble in water. It has the formula

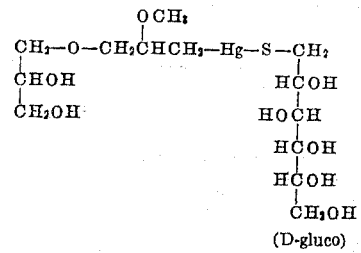

*Example 2*

17.2 parts by weight of 4-allyloxymethyl-2,2-dimethyl-1,3-dioxolane is dissolved in 50 parts by volume of water and 50 parts by volume of dioxane. A solution of 31.8 parts by weight of mercuric acetate in 100 parts by volume of water is added while stirring. The reaction mixture is allowed to stand overnight at room temperature, a sample tested for free mercury ion by making alkaline and, in the absence of free mercury ion, the reaction mixture evaporated to dryness. The product is dissolved in anhydrous ethanol, the solution filtered and evaporated to dryness to yield the syrupy product, 4-(3-acetoxymercuri - 2 - hydroxypropoxymethyl) - 2,2 - dimethyl - 1,3-dioxolane corresponding to the structure

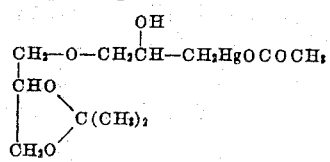

9.0 parts by weight of 4-(3-acetoxymercuri-2-hydroxypropoxymethyl)2,2-dimethyl-1,3-dioxolane is dissolved in 135 parts by volume of 50% aqueous acetic acid and warmed to 60° for two hours. The reaction mixture is then evaporated to dryness, the residue taken up in absolute ethanol and again evaporated to dryness to yield 1-(2-hydroxy-3-acetoxymercuripropyl)-glycerol as a colorless highly viscous oil corresponding to the formula

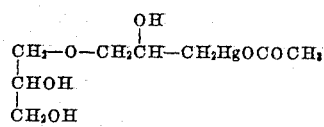

4.0 parts by weight of 1-(2-hydroxy-3-acetoxymercuripropyl)-glycerol and 2 parts by weight of 1-thiosorbitol are dissolved in 10 parts by volume of water. The product is precipitated by adding 100 parts by volume of acetone. The supernatant liquor is decanted, and the residue washed repeatedly with fresh acetone and dried under reduced pressure to yield 1-S-[3-(2,3-dihydroxypropoxy) - 2 - hydroxy - mercuripropyl] - 1 - thiosorbitol as an amorphous hygroscopic solid corresponding to the formula

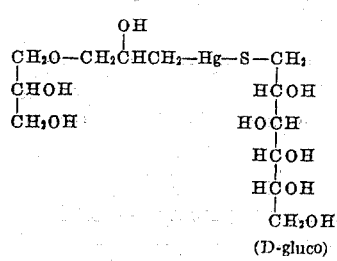

*Example 3*

20 parts by weight of 1,2;4,5-diisopropylidene-xylitol is dissolved in 20 parts by volume of water and 85 parts by volume of acetone. The resultant solution is made alkaline with 32 parts by weight of sodium hydroxide in 32 parts by volume of water, and to the thus-obtained solution are added 16.6 parts by weight of allyl bromide dissolved in 25 parts by volume of acetone. The allyl bromide solution is added dropwise with stirring over a period of three hours at 75°. The acetone is then removed by distillation, the residue diluted with 200 parts by volume of water, and the aqueous solution neutralized partially with 16 parts by volume of concentrated sulfuric acid in 50 parts by volume of water. The resulting solution is extracted four times with ether, each time with 100 parts by volume, and the combined extracts dried over anhydrous potassium carbonate and then evaporated to dryness. The residue is distilled under reduced pressure, boiling at 94–96° at 0.05 mm. pressure.

5.5 parts by weight of 3-allyl-1,2;4,5-diisopropylidene xylitol is dissolved in 50 parts by volume of dioxane. A solution of 6.36 parts by weight of mercuric acetate and 50 parts by volume of water is added while stirring. The reaction mixture is allowed to stand for 16 hours, tested for free mercury ion as described in Example 1 and then evaporated to dryness in vacuo. The residue is taken up in absolute ethanol, the solution filtered, and evaporated to dryness in vacuo to yield 3-(3-acetoxymercuri-2-hydroxypropyl)-1,2;4,5-diisopropylidene xylitol as a syrup corresponding to the formula

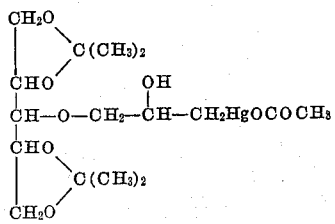

10 parts by weight of the latter are warmed for two hours at 60° with 150 parts by volume of 50% aqueous acetic acid. The solution is then evaporated to dryness, the residue taken up in absolute ethanol and again evaporated to dryness to yield 3-(3-acetoxymercuri-2-hydroxypropyl) xylitol as a syrup corresponding to the formula

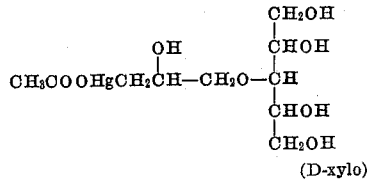

(D-xylo)

4.69 parts by weight of 3-(3-acetoxymercuri-2-hydroxypropyl) xylitol are dissolved in 10 parts by volume of methanol to which an equimolecular amount of 1-thiosorbitol, dissolved in 5 parts by volume of methanol, is added. A precipitate forms. 5 parts by volume of acetone are added to complete the precipitation. The residue is washed with dry acetone, and dried under reduced pressure to an amorphous hygroscopic solid, 3-[2-hydroxy-3 - (D - gluco - pentahydroxyhexyl - mercapto - mercuri)-propyl]-D-xylitol, which corresponds to the formula

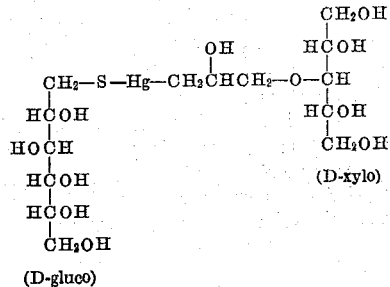

(D-gluco)

Example 4

2.2 parts by weight of 3-allyl-glucose (prepared from 3-allyl-1,2;5,6-diisopropylidene glucose by refluxing for four hours with 4% sulfuric acid, then neutralized with barium carbonate. The mixture is filtered, evaporated to dryness, the residue dissolved in ethanol and evaporated to dryness and recrystallized from ethanol-ethyl acetate; M. P. 133–136°), are dissolved in 10 parts by weight of methanol, and to the resultant solution there is then added a solution of 3.18 parts by weight of mercuric acetate in 50 parts by weight of methanol. The reaction mixture is allowed to stand for 16 hours, whereupon it is concentrated to a thick syrup under reduced pressure. The syrup is triturated with acetone and is then dried under reduced pressure. The thus-obtained amorphous solid corresponds to the formula

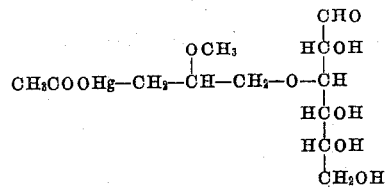

5.1 parts by weight of 3-(2-methoxy-3-acetoxy-mercuri-propyl)-glucose are dissolved in 10 parts by volume of water, and a 5–10% molar excess of 1-thiosorbitol added. The resulting solution gives a faint positive test for free sulfhydryl radicals when tested with sodium prusside. The solution is concentrated under reduced pressure and the syrupy product obtained as the residue is triturated with acetone and dried under reduced pressure. It is 3-[2 - methoxy - 3 - (D-gluco-pentahydroxyhexyl-mercapto-mercuri)-propyl]-D-glucose corresponding to the formula

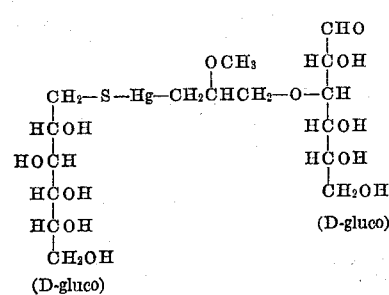

(D-gluco)

In the above formulae glucose is depicted in the straight chain configuration. It is known that glucose occurs in cyclic form and our invention is understood to embrace the cyclic structure of glucose in the above compounds.

By substituting an equivalent quantity of ethanol of ethanol or propanol for methanol in the preceding paragraphs the corresponding ethoxy and propoxy derivatives are obtained.

Example 5

6.1 parts by weight of 3-allyl-1,2;5,6-diisopropylidene glucose is dissolved in 50 parts by volume of dioxane. A solution of 6.4 parts by weight of mercuric acetate in 20 parts by volume of water is added while stirring. After standing for 16 hours at room temperature, the solution is tested for free mercury ion as in Example 1, filtered and concentrated in vacuo. The residue is taken up in absolute ethanol, filtered and evaporated in vacuo to yield 3-(3-acetoxymercuri-2-hydroxypropyl)-1,2;5,6-diisopropylidene glucose as a highly viscous syrup corresponding to the formula

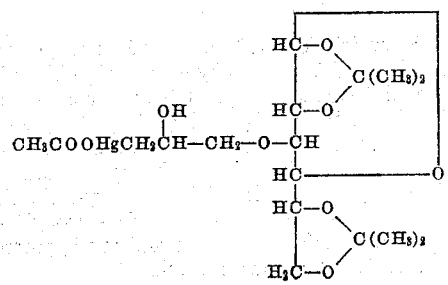

10 parts by weight of the latter product are warmed with 150 parts by volume of 50% aqueous acetic acid at 60° for three hours, the solution concentrated to a thick syrup in vacuo, the residue taken up in absolute ethanol and again evaporated to dryness to vacuo to yield 3-(3-acetoxymercuri-2-hydroxypropyl) glucose as a thick syrup corresponding to the formula

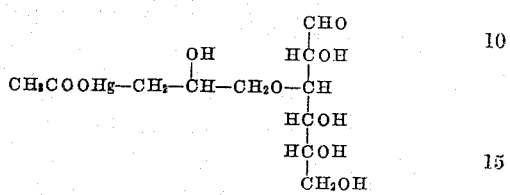

5 parts by weight of 3-(2-hydroxy-3-acetoxymercuripropyl)-glucose are dissolved in 10 parts by volume of water, and a 5–10% molar excess of 1-thiosorbitol added. The resulting solution gives a faint positive test for free sulfhydryl radicals when tested with sodium prusside. The solution is concentrated under reduced pressure and the syrupy product obtained as the residue is triturated with acetone and dried under reduced pressure. It is the 3 - [2 - hydroxy - 3 - (D - gluco - pentahydroxyhexyl-mercapto - mercuri) - propyl] - D - glucose corresponding to the formula

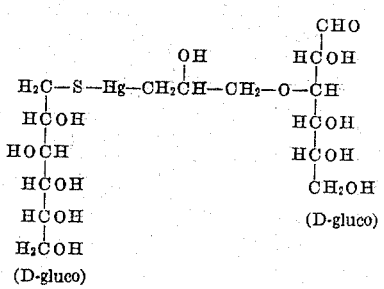

Example 6

9.4 parts by weight of 6-allylsorbitol is dissolved in 25 parts by volume of methanol, and a solution of 13.45 parts by weight of mercuric acetate in 150 parts by volume of methanol added. After standing overnight, the solution is tested for the presence of free mercury ion as in Example 1, filtered and evaporated to dryness. The residue is taken up in absolute ethanol and again evaporated to dryness to yield 6-(2-methoxy-3-acetoxymercuripropyl) sorbitol as a syrup corresponding to the formula

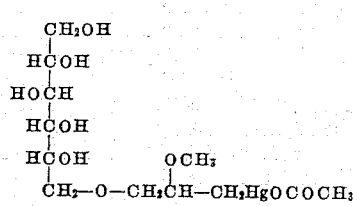

5 parts by weight of 6-(2-methoxy-3-acetoxymercuripropyl) sorbitol and 2.25 parts by weight of 1-thiosorbitol (90%) are dissolved in 10 parts by volume of water. The product is precipitated by adding 100 parts by volume of acetone. The supernatant liquor is decanted, and the residue washed repeatedly with fresh acetone and dried under reduced pressure to yield 6-[2-methoxy-3-(D-glucopentahydroxyhexyl - mercapto - mercuri) - propyl] - D-sorbitol which is obtained as an amorphous hygroscopic solid and corresponds to the formula

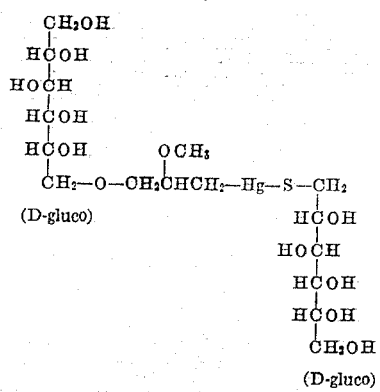

Example 7

8.9 parts by weight of 3-allylmannitol are dissolved in 55 parts by volume of warm methanol. A solution of 12.7 parts by weight of mercuric acetate in 170 parts by volume of methanol are added slowly. After standing overnight the solution is filtered and evaporated to dryness in vacuo. The product, 3-(2-methoxy-3-acetoxymercuripropyl)-D-mannitol, is obtained as a syrup which is dried under reduced pressure.

13.7 parts by weight of the 3-(2-methoxy-3-actoxymercuripropyl)-D-mannitol are dissolved in 20 parts by volume of methanol. A solution of an equivalent amount of 1-thiosorbitol in 15 parts by volume of methanol is added, and 20 parts by volume of acetone are then added which causes the product, 3-[2-methoxy-3-D-glucopentahydroxyhexyl - mercaptomercuripropyl] - D - mannitol, to precipitate. The mother liquors are decanted, and the precipitate triturated with acetone and dried in vacuo to an amorphous hygroscopic solid of the following structure:

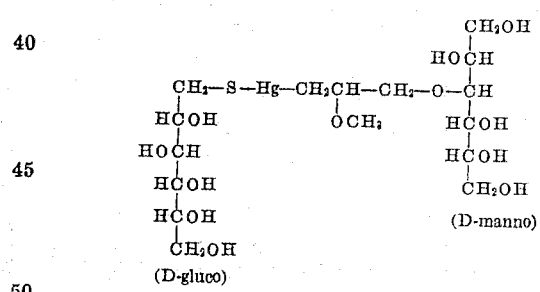

By using ethanol instead of methanol in this example, the corresponding ethoxy derivative is obtained.

Example 8

2.22 parts by weight of 3-allylmannitol are dissolved in 15 parts by volume of ethylene glycol. A solution of 3.18 parts by weight of mercuric acetate in 25 parts by volume of ethylene glycol is added. The reaction mixture is allowed to stand overnight at room temperature (20–30°), then concentrated in vacuo (bath temp. 100–110°). The residue is dissolved in 5 parts by volume of methanol. The product is precipitated by addition of 30 parts by volume of acetone, triturated with acetone and dried in vacuo, whereupon it is obtained as a very hygroscopic solid having the formula

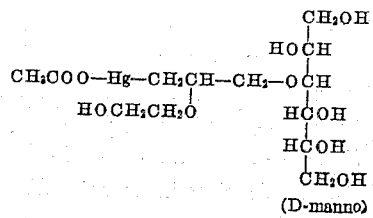

5.43 parts by weight of 3-[3-acetoxy-mercuri-2-(β-hydroxy-ethoxy)-propyl]-D-mannitol are dissolved in 10 parts by volume of methanol. A solution of an equivalent amount of 1-thiosorbitol in 8 parts by volume of methanol is added. A precipitate forms and 10 parts by volume of acetone are added to obtain more complete precipitation. The mother liquors are decanted, the product triturated with acetone and dried in vacuo to yield 3 - [2 - (β - hydroxyethoxy) - 3 - (D - gluco - pentahydroxyhexyl-mercaptomercuri)-propyl]-D-mannitol, as an amorphous solid having the formula

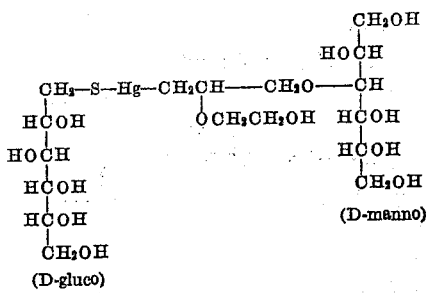

Example 9

2.15 parts by weight of 3-(2-methoxy-3-acetoxymercuripropyl)-D-mannitol are dissolved in 15 parts by volume of methanol and 0.75 part by weight of theophylline added. After the theophylline dissolves the solution is filtered and concentrated in vacuo. The residue is triturated repeatedly with dry acetone and then dried in vacuo to an amorphous solid which is highly soluble in water and has the formula

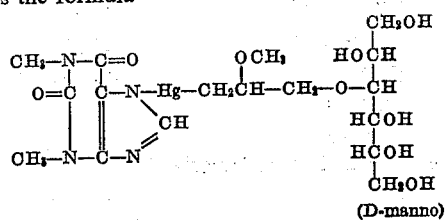

Example 10

1.85 parts by weight of 3-(2-hydroxy-3-acetoxymercuripropyl)-glucose are dissolved in 5 parts by volume of water to which is added a solution of 0.335 part by weight of mercapto-acetic acid dissolved in two parts by volume of water and 3.65 parts by volume of normal aqueous sodium hydroxide solution. The reaction mixture is filtered and concentrated in vacuo. The residue is treated with acetone and dried in vacuo to an amorphous solid which decomposes on heating to 60–75° and has the structure

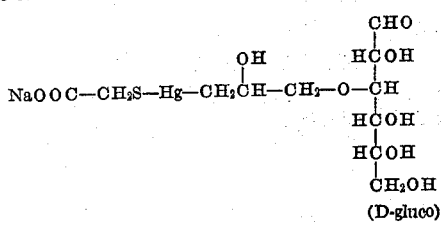

Example 11

2.2 parts by weight of 3-allylmannitol are dissolved in 10 parts by weight of methanol, a solution of 3.18 parts by weight of mercuric acetate in 50 parts by weight of methanol is added, and the thus-prepared reaction mixture is allowed to stand at room temperature (20–30°) for 16 hours. The solution is then concentrated under reduced pressure, and the residue triturated with acetone and dried under reduced pressure to yield a highly viscous syrup which corresponds to the formula

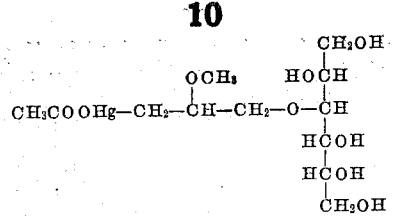

5.13 parts by weight of 3-(2-methoxy-3-acetoxymercuripropyl)-D-mannitol are dissolved in 15 parts by volume of methanol to which one equivalent of 1-thioglycerol is added. The solution is concentrated in vacuo and the residue triturated with dry acetone and dried in vacuo. The product thus produced, 3-[3-(2,3-dihydroxypropyl-mercaptomercuri) - 2 - methoxy - propyl] - D - mannitol, is highly soluble in water and has the structure

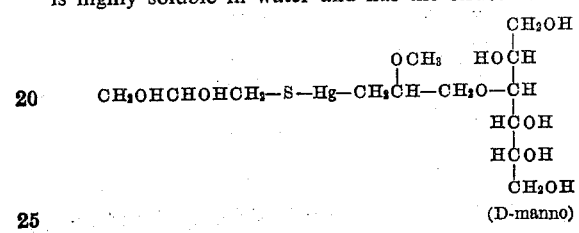

Example 12

5.13 parts by weight of 3-(2-methoxy-3-acetoxymercuripropyl)-D-mannitol are dissolved in 15 parts by volume of methanol to which one equivalent of 1-thioxylitol is added. The solution is concentrated in vacuo and the residue triturated with dry acetone and dried in vacuo. The product thus produced, 3-[2-methoxy-3-(D-xylo-tetrahydroxypentyl - mercaptomercuri) - propyl] - D - mannitol, is highly soluble in water and has the structure

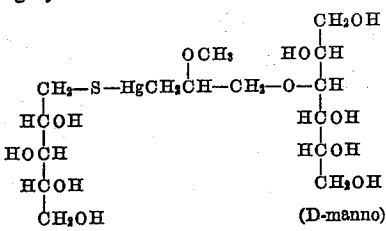

Example 13

5.4 parts by weight of 3-allylmannitol is treated with 40 parts by volume of pyridine and 30 parts by volume of acetic anhydride. After standing for 16 hours the reaction mixture is concentrated in vacuo. The residue is dissolved in chloroform and washed with water. After drying the chloroform solution it is concentrated in vacuo and the oily penta-acetyl-3-allyl-mannitol distilled at 205° and 0.2 mm. pressure.

6.3 parts by weight of penta-acetyl-3-allyl-mannitol is dissolved in 25 parts by volume of dioxane and 10 parts by volume of water. 4.64 parts by weight of mercuric acetate dissolved in 15 parts by volume of water is added. After standing at room temperature overnight the solution is concentrated in vacuo. The residue is dissolved in 30 parts by volume of alcohol and 25 parts by volume of N methanolic sodium hydroxide added slowly. After a short time the deacetylated product precipitates as a very hygroscopic material. It is filtered off and has the following structure:

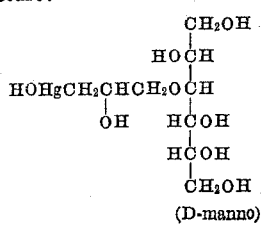

The deacetylated product is dissolved in 80 parts by volume of alcohol and 1.1 parts by volume of glacial acetic acid and filtered through activated carbon. 3.4 parts by weight of thiosorbitol (equivalent weight by titration is 230) is dissolved in 10 parts by volume of alcohol. The solution of the mercurated product is added dropwise with cooling. A precipitate forms which is filtered off, washed with acetone and dried in vacuo. The product, 3-[2-hydroxy-3-(D-gluco-pentahydroxyhexyl-mercapto-mercuri)-propyl]-D-mannitol, is an amorphous hygroscopic material of the following structure:

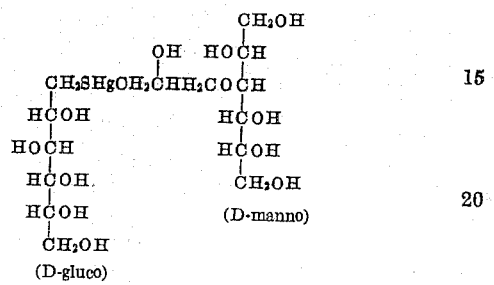

This application is a continuation-in-part of our copending application Serial No. 248,452, filed September 26, 1951, now abandoned.

Having thus disclosed the invention, what is claimed is:

1. An organic mercury compound which corresponds to the formula

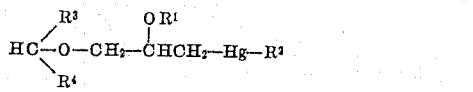

wherein $R^1$ is a member selected from the group consisting of hydrogen, lower alkyl and lower hydroxyalkyl, $R^2$ is a radical selected from the group consisting of the 1,3-dimethyl-xanthine-7-yl radical polyhydroxyalkylthio radicals, and radicals of the formula X—S—, wherein X is an aliphatic radical containing a carboxyl group, $R^3$ is a member selected from the group consisting of hydrogen, —(CHOH)$_{n-1}$.CH$_2$OH and —(CHOH)$_{n-1}$.CHO, and $R^4$ is a member selected from the group consisting of hydrogen and —(CHOH)$_{n-1}$.CH$_2$OH, $n$ being a whole number from 1 to 6, at most one of $R^3$ and $R^4$ being hydrogen and the total number of carbon atoms in $R^3$—C—$R^4$ being within the range of 3 to 6 inclusive.

2. The compound of the formula

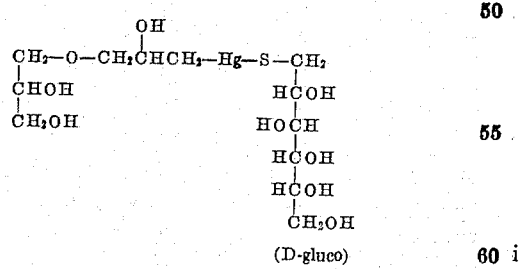

3. The compound of the formula

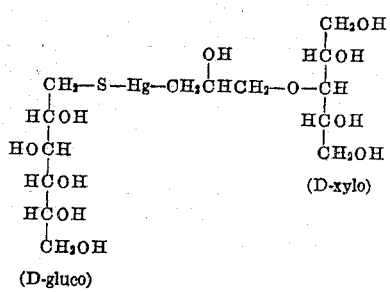

4. The compound of the formula

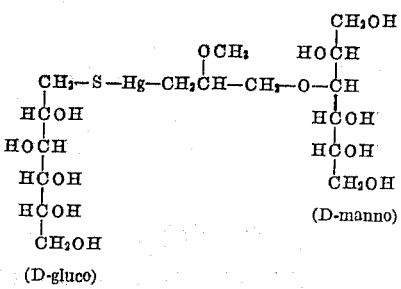

5. The compound of the formula

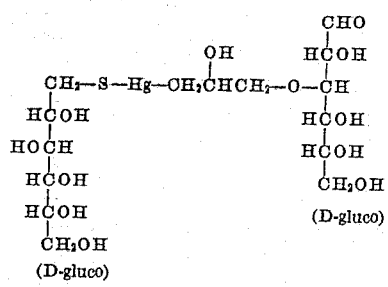

6. The compound of the formula

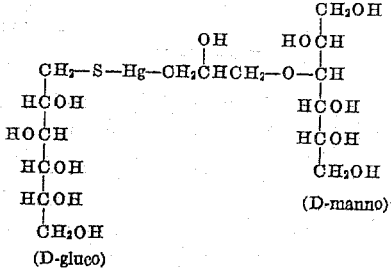

References Cited in the file of this patent

UNITED STATES PATENTS 2,440,729    Signaigo           May 4, 1948

OTHER REFERENCES

Shukis, J. A. C. S., v. 65, pp. 2365–6, Dec. 1943, copy in Patent Office Library.